US006978126B1

(12) United States Patent
Blaker et al.

(10) Patent No.: US 6,978,126 B1

(45) Date of Patent: Dec. 20, 2005

(54) TRANSCEIVER WITH CLOSED LOOP CONTROL OF ANTENNA TUNING AND POWER LEVEL

(75) Inventors: David Blaker, Holland, MI (US); Matthew Cardwell, Holland, MI (US); Paul Duckworth, Elkhart, IN (US); Brian Honeck, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 531 days.

(21) Appl. No.: 10/009,236

(22) PCT Filed: Jun. 7, 2000

(86) PCT No.: PCT/US00/40159

§ 371 (c)(1), (2), (4) Date: May 6, 2002

(87) PCT Pub. No.: WO00/75905

PCT Pub. Date: Dec. 14, 2000

Related U.S. Application Data

(60) Provisional application No. 60/137,860, filed on Jun. 7, 1999.

(51) Int. Cl.[7] ........................... H04B 1/04; G05B 19/02

(52) U.S. Cl. ................ 455/352; 455/151.2; 455/127.2; 455/115.1; 455/193.1; 340/825.22

(58) Field of Search ...................... 455/151.2, 193.1–3, 455/352, 93, 102, 127.2, 151.1, 67.11, 115.1, 455/120, 123, 169.1, 169.2; 340/825.22, 340/825.69, 825.72; 343/745, 845

(56) References Cited

U.S. PATENT DOCUMENTS

| | | | | |
|---|---|---|---|---|
| 4,343,001 | A * | 8/1982 | Anderson et al. | 343/745 |
| 5,126,686 | A * | 6/1992 | Tam | 330/134 |
| 5,225,847 | A * | 7/1993 | Roberts et al. | 343/745 |
| 5,263,183 | A * | 11/1993 | Owen | 455/193.1 |
| 5,379,453 | A * | 1/1995 | Tigwell | 455/151.2 |
| 5,442,340 | A * | 8/1995 | Dykema | 340/825.22 |
| 5,564,101 | A * | 10/1996 | Eisfeld et al. | 455/352 |
| 5,614,891 | A * | 3/1997 | Zeinstra et al. | 340/825.22 |
| 5,645,701 | A * | 7/1997 | Duckworth et al. | 340/825.69 |
| 5,699,054 | A * | 12/1997 | Duckworth | 340/825.22 |
| 5,699,055 | A * | 12/1997 | Dykema et al. | 340/825.22 |
| 5,793,300 | A * | 8/1998 | Suman et al. | 340/825.22 |
| 5,854,593 | A * | 12/1998 | Dykema et al. | 340/825.22 |
| 5,903,226 | A * | 5/1999 | Suman et al. | 340/825.69 |
| 6,021,319 | A * | 2/2000 | Tigwell | 455/151.2 |
| 6,072,404 | A * | 6/2000 | Nolan et al. | 340/825.69 |
| 6,091,343 | A * | 7/2000 | Dykema et al. | 340/825.69 |
| 6,658,239 | B1 * | 12/2003 | Elder et al. | 455/121 |

* cited by examiner

*Primary Examiner*—Edward F. Urban
*Assistant Examiner*—Blane J. Jackson
(74) *Attorney, Agent, or Firm*—Foley & Lardner LLP

(57) ABSTRACT

A trainable transceiver for learning and transmitting an activation signal that includes an RF carrier frequency modulated with a code for remotely actuating a device, such as a garage door opener. The trainable transceiver preferably includes a controller, a signal generator, and a dynamically tunable antenna having a variable impedance that may be selectively controlled in accordance with a detector circuit signal. The detector circuit provides a measurement of the transmission power and is also used to vary the applied transmission power of the transceiver in response to operating and environmental parameters.

21 Claims, 12 Drawing Sheets

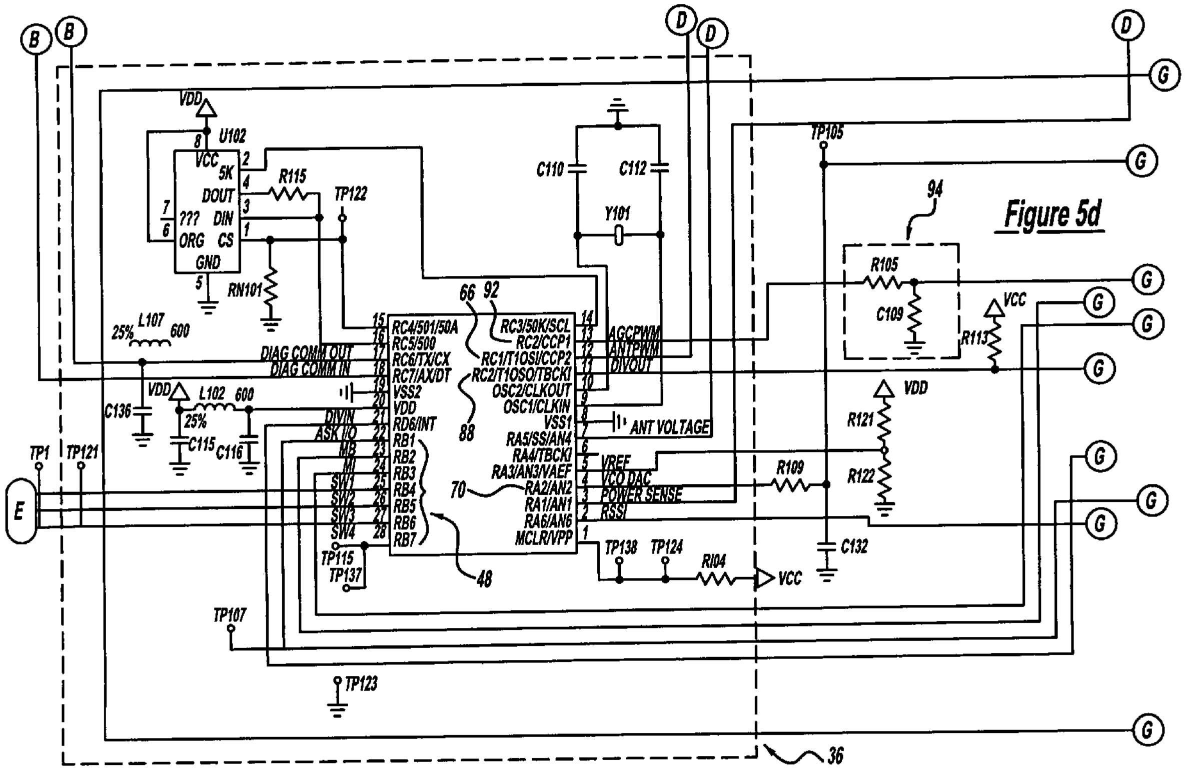
Figure 5d
U102
VDD
VCC
5K
DOUT
DIN
???
ORG
CS
GND
R115
TP122
RN101
L107
25%
600
C136
L102
C115
C116
TP1
TP121
E
DIAG COMM OUT
DIAG COMM IN
DIVIN
ASK I/O
MB
MI
SW1
SW2
SW3
SW4
RC4/501/50A
RC5/500
RC6/TX/CX
RC7/AX/DT
VSS2
VDD
RD6/INT
RB1
RB2
RB3
RB4
RB5
RB6
RB7
RC3/50K/SCL
RC2/CCP1
RC1/T1OSI/CCP2
RC2/T1OSO/TBCKI
OSC2/CLKOUT
OSC1/CLKIN
VSS1
RA5/SS/AN4
RA4/TBCKI
RA3/AN3/VAEF
RA2/AN2
RA1/AN1
RA6/AN6
MCLR/VPP
AGCPWM
ANTPWM
DIVOUT
ANT VOLTAGE
VREF
VCO DAC
POWER SENSE
RSSI
66
92
88
70
48
94
36
C110
C112
Y101
TP105
R105
C109
R113
R121
R122
R109
C132
TP138
TP124
RI04
TP115
TP137
TP107
TP123
B
D
G

TRANSCEIVER WITH CLOSED LOOP CONTROL OF ANTENNA TUNING AND POWER LEVEL

This application claims the benefit of U.S. Provisional Application No. 60/137,860, filed Jun. 7, 1999.

BACKGROUND OF THE INVENTION

Trainable transceivers for use with electrically operated garage door mechanisms are an increasingly popular home convenience. Such transceivers are typically permanently located in a vehicle and are powered by a vehicle's battery. These trainable transceivers are capable of learning the radio frequency, modulation scheme, and data code of an existing portable remote RF transmitter associated with an existing receiving unit located in the vehicle owner's garage. Thus, when a vehicle owner purchases a new car having such a trainable transceiver, the vehicle owner may train the transceiver to the vehicle owner's existing clip-on remote RF transmitter without requiring any new installation in the vehicle or home. Subsequently, the old clip-on transmitter can be discarded or stored.

If a different home is purchased or an existing garage door opener is replaced, the trainable transceiver may be retrained to match the frequency and code of any new garage door opener receiver that is built into the garage door opening system or one which is subsequently installed. The trainable transceiver can be trained to any remote RF transmitter of the type utilized to actuate garage door opening mechanisms or other remotely controlled devices such as house lights, access gates, and the like. It does so by learning not only the code and code format (i.e., modulation scheme), but also the particular RF carrier frequency of the signal transmitted by any such remote transmitter. After being trained, the trainable transceiver actuates the garage door opening mechanism without the need for the existing separate remote transmitter. Such a trainable transceiver is disclosed in U.S. Pat. No. 5,442,340 which is hereby incorporated by reference.

Trainable transceivers may have several problems including: an antenna that is not tuned at all frequencies, where the transmission range will vary as a function of frequency; and transmission power fluctuations created by various environmental conditions and circuit component manufacturing inconsistencies. Trainable transceivers are limited by the amount of space they may occupy in a vehicle cabin, leading to small antenna types and sizes, such as a loop antenna used in the present invention. In order to effectively use a small loop antenna it must be very high Q and tuned exactly to the operating frequency. High Q can be understood as high efficiency and very narrow bandwidth. The higher the Q, the higher the output field strength will be. However due to the narrow bandwidth limitations of the present invention, slight mistuning can result in significant power reduction.

Trainable transceivers may also vary their power output, as a function of their duty cycle or on-time and with respect to other various environmental variables. It is possible to increase transmission output power and thus transmitter range under certain FCC regulations. The FCC regulations limit the transmission power of a such a transceiver with respect to their duty cycle. The higher the duty cycle, the less power that may be transmitted, as the transmission power level the FCC regulates is averaged over time. Thus, for a transmitter having a low duty cycle the transmission strength may be greater than that of a transmitter having a higher duty cycle.

A further problem present in prior transmitters is the variability of transmission range due to component manufacturing inconsistencies and environmental variables. The transmission range of a transceiver may be affected by temperature. For example, in cold temperatures the power output of a transmitter will be less than that at a warmer temperature. A transmitter should ensure consistent transmission range under all environmental conditions.

SUMMARY OF THE INVENTION

According to one aspect of the present invention, a trainable transceiver is provided that efficiently transmits and receives RF signals at various frequencies. Another aspect of the present invention is to provide a trainable transceiver capable of dynamically tuning an antenna for maximum efficiency at all frequencies of use. A further aspect of the present invention is to detect the RF voltage or power level of the transmission on the antenna and adjust it with reference to on-time characteristics or other variables. To achieve these and other advantages, and in accordance with the purpose of the invention as embodied and described herein, the trainable transceiver of the present invention includes a dynamically tunable antenna, a controller, a power level sense or detector circuit, and a signal generator.

In operation, the transceiver of the present invention receives and records an activation signal from an existing remote transmitter and transmits the previously encoded modulated radio frequency carrier signal provided by the signal generator. The controller is coupled to antennas and has two modes of operation: a learning mode and an operating mode. In the learning mode, the controller receives the activation signal from the receiving antenna for storing data corresponding to the radio frequency, modulation scheme, and code of the activation signal. In the operating mode, the controller provides output data, which identifies the radio frequency and code of the received activation signal. Additionally, the controller further provides an antenna control signal electrically coupled to the control input of the dynamically tunable antenna in order to selectively control the resonance frequency of the dynamically tunable antenna to maximize the transmission efficiency of the antenna. The signal generator is coupled to the controller and the dynamically tunable antenna and is used for transmitting an encoded modulated radio frequency carrier signal, which corresponds to the received activation signal, from the receiving antenna.

Another aspect of the present invention is the ability to vary the transmit power of the transceiver by varying its RF voltage or output power with reference to the duty cycle of the transmission. The present invention maximizes the transmission range for the transceiver which is dependent on the accuracy of tune on an integral tunable antenna and the control of the transmit power level. U.S. Pat. No. 5,699,054 discloses such an antenna and is incorporated by reference herein.

As discussed previously, the transceiver of the present invention is packaged into a small compartment and uses a small loop antenna. However, due to the narrow bandwidth limitations of the present invention, slight mistuning of a loop antenna can result in significant power reduction. To reduce mistuning effects on the transceiver of the present invention, a feedback circuit provides amplitude tuning information to an onboard microprocessor. The feedback circuit consists of a Schottky detector diode and bias components and, as previously discussed, is referred to as the power level sense or detector circuitry. The detector circuitry provides a DC voltage proportional to the RF voltage on the antenna. As the antenna is tuned toward resonance, the detector output voltage rises until resonance is reached and then begins to drop again past resonance. The microprocessor is programmed with algorithms that will tune the antenna exactly to peak resonance and optimum power levels. Additionally, the same detector output is used to evaluate and adjust the output power level of the antenna and the microprocessor is programmed with algorithms that will tune the antenna to its maximum allowable output power.

BRIEF DESCRIPTION OF THE DRAWINGS

FIGS. 5*a*–5*e* are an electrical circuit diagram in schematic form of the transceiver circuitry, according to the preferred embodiment of the present invention.

DETAILED DESCRIPTION OF THE PREFERRED EMBODIMENT

The following description of the present invention is merely exemplary in nature and is in no way intended to limit the invention or its uses. Moreover, the following description, while depicting a tunable transceiver designed to operate with a garage door mechanism, is intended to adequately teach one skilled in the art to make and use the tunable transceiver with any similar type RF transmission and receiving applications.

Figure 1:
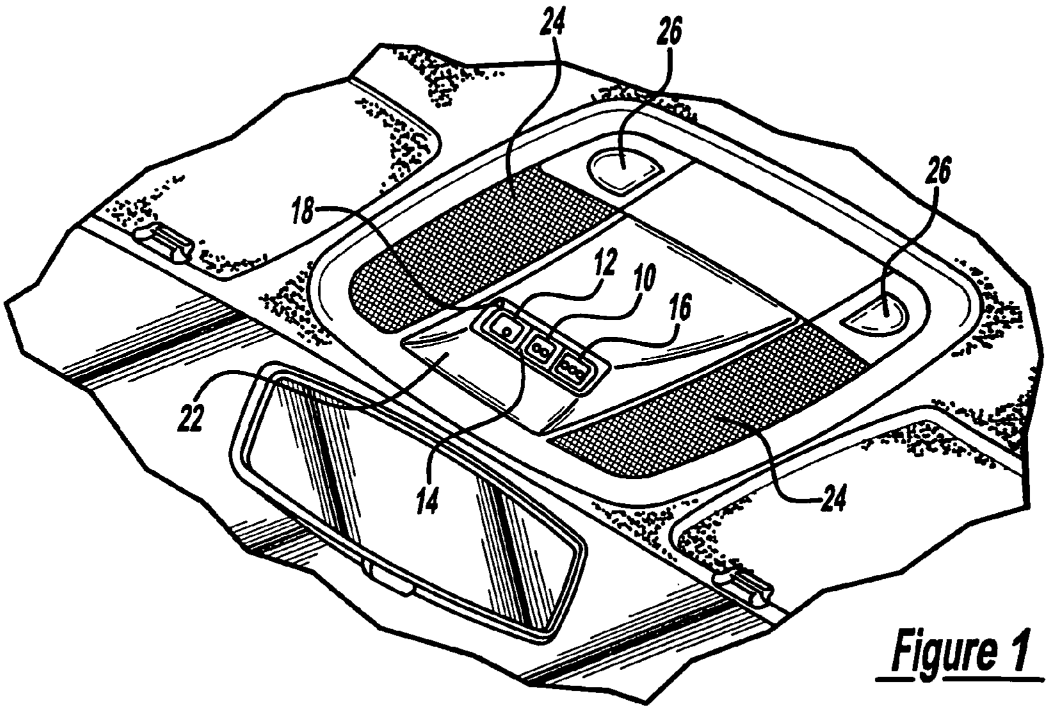
FIG. 1 is a fragmentary perspective view of a vehicle interior having an overhead console for housing the trainable transceiver, according to the preferred embodiment of the present invention.
Figure 2:
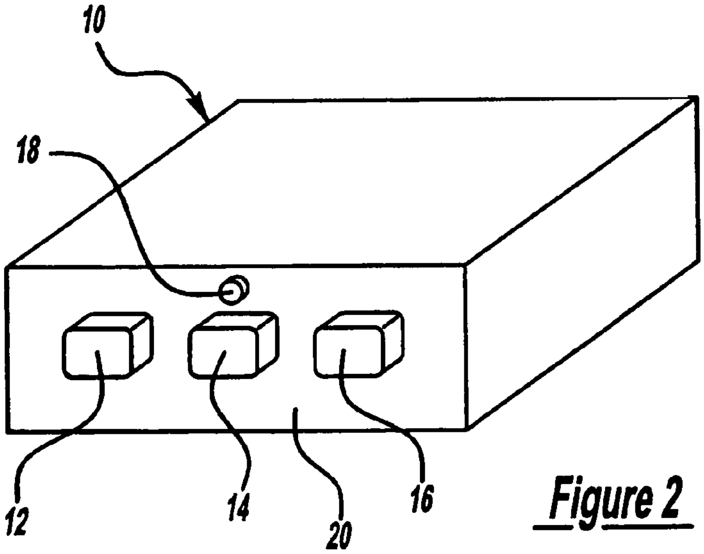
FIG. 2 is a perspective view of a trainable transceiver, according to the preferred embodiment of the present invention.

FIGS. 1 and 2 show a trainable transceiver 10 of the present invention. Trainable transceiver 10 includes three pushbutton switches 12, 14, and 16, a light emitting diode (LED) 18, and an electrical circuit board and associated circuits that may be mounted in a housing 20. As explained in greater detail below, the switches 12, 14, and 16 may each be associated with a separate garage door or other device to be controlled. The trainable transceiver housing 20 is preferably of appropriate dimensions for mounting within a vehicle accessory such as an overhead console 22 as shown in FIG. 1. In the configuration shown in FIG. 1, the trainable transceiver 10 includes electrical conductors coupled to the vehicle's electrical system for receiving power from the vehicle's battery. The overhead console 22 includes other accessories such as map reading lamps 24 controlled by switches 26. It may also include an electronic compass and display (not shown).

Figure 3:
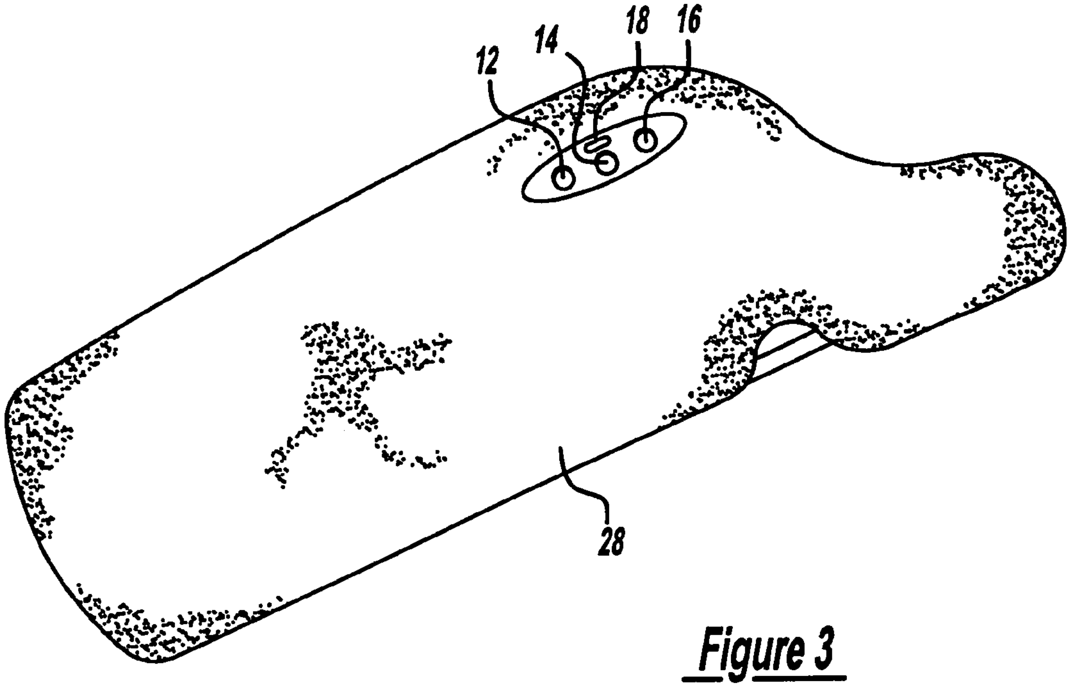
FIG. 3 is a perspective view of a visor incorporating the trainable transceiver, according to the preferred embodiment of the present invention.
Figure 4:
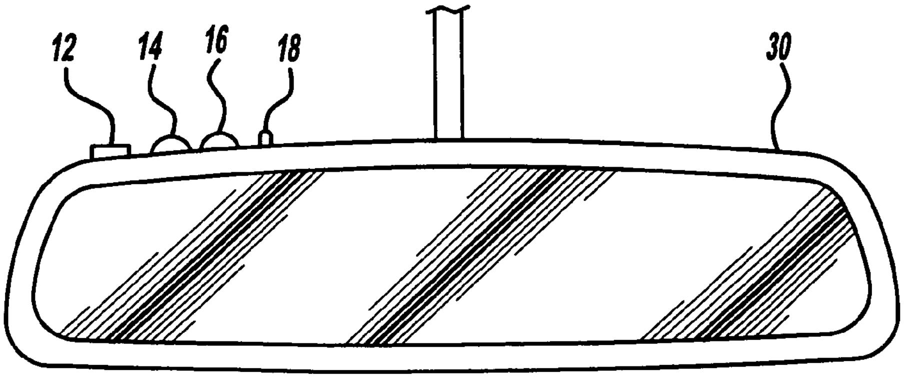
FIG. 4 is a perspective view of a mirror assembly incorporating the trainable transceiver, according to the preferred embodiment of the present invention.
Figure 5A:
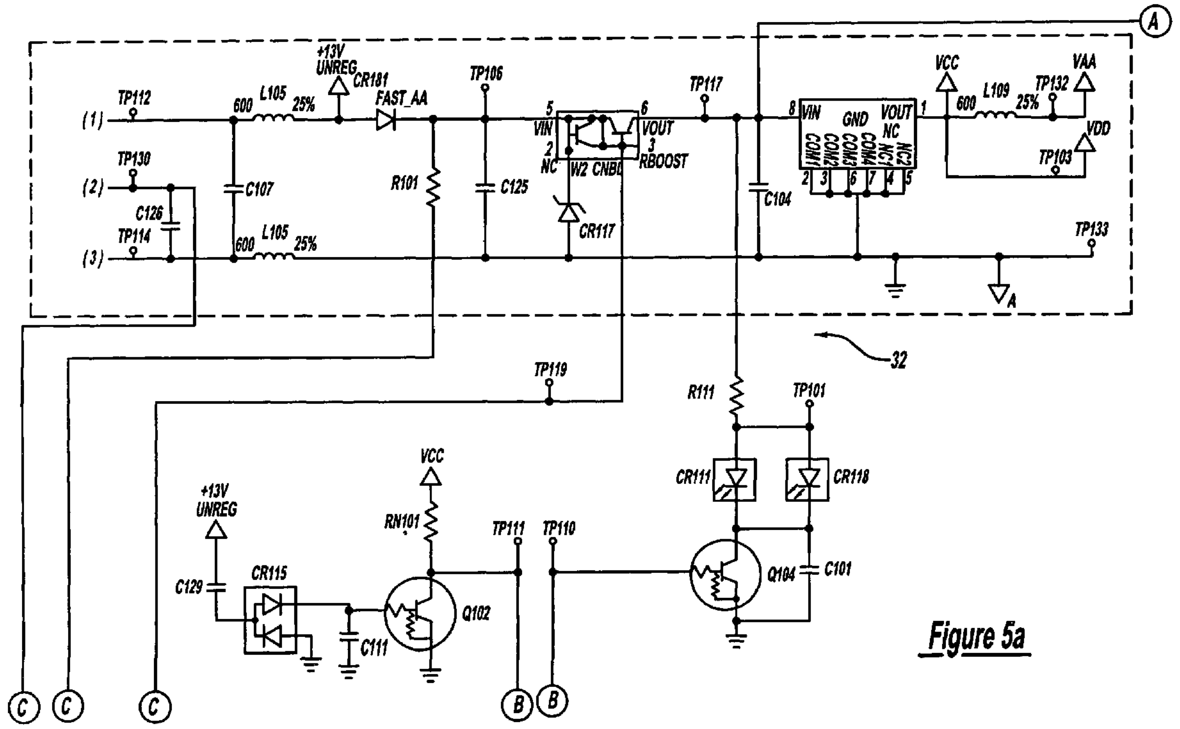
Figure 5B:
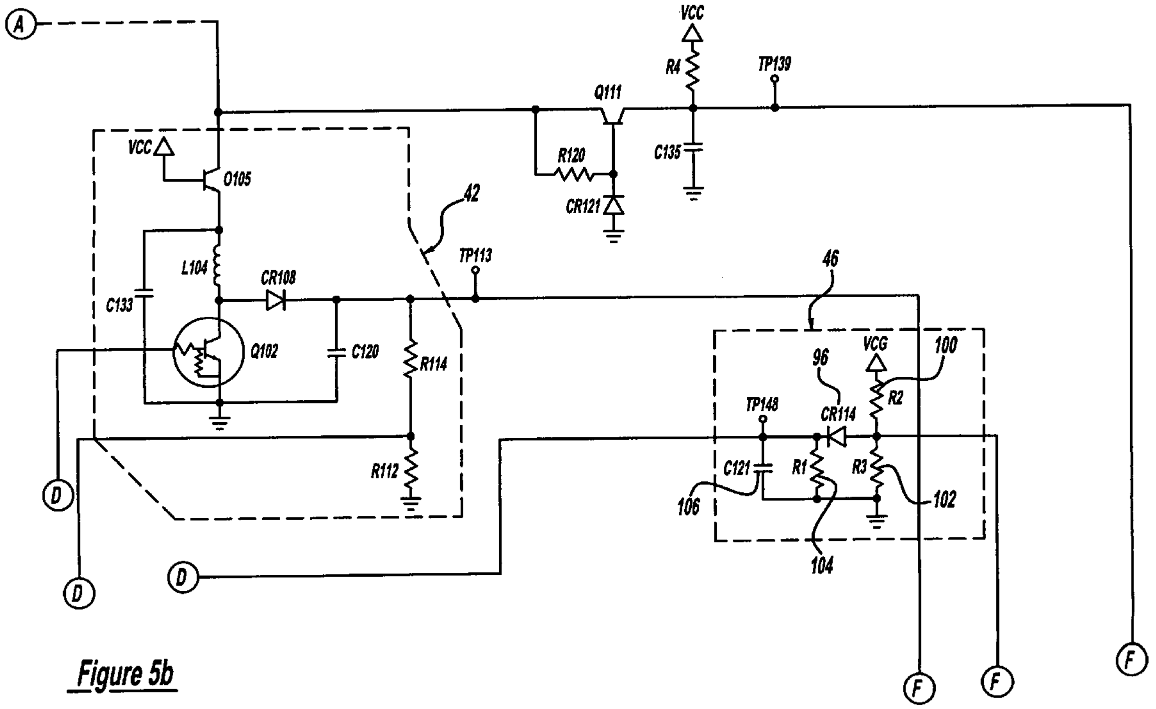
Figure 5C:
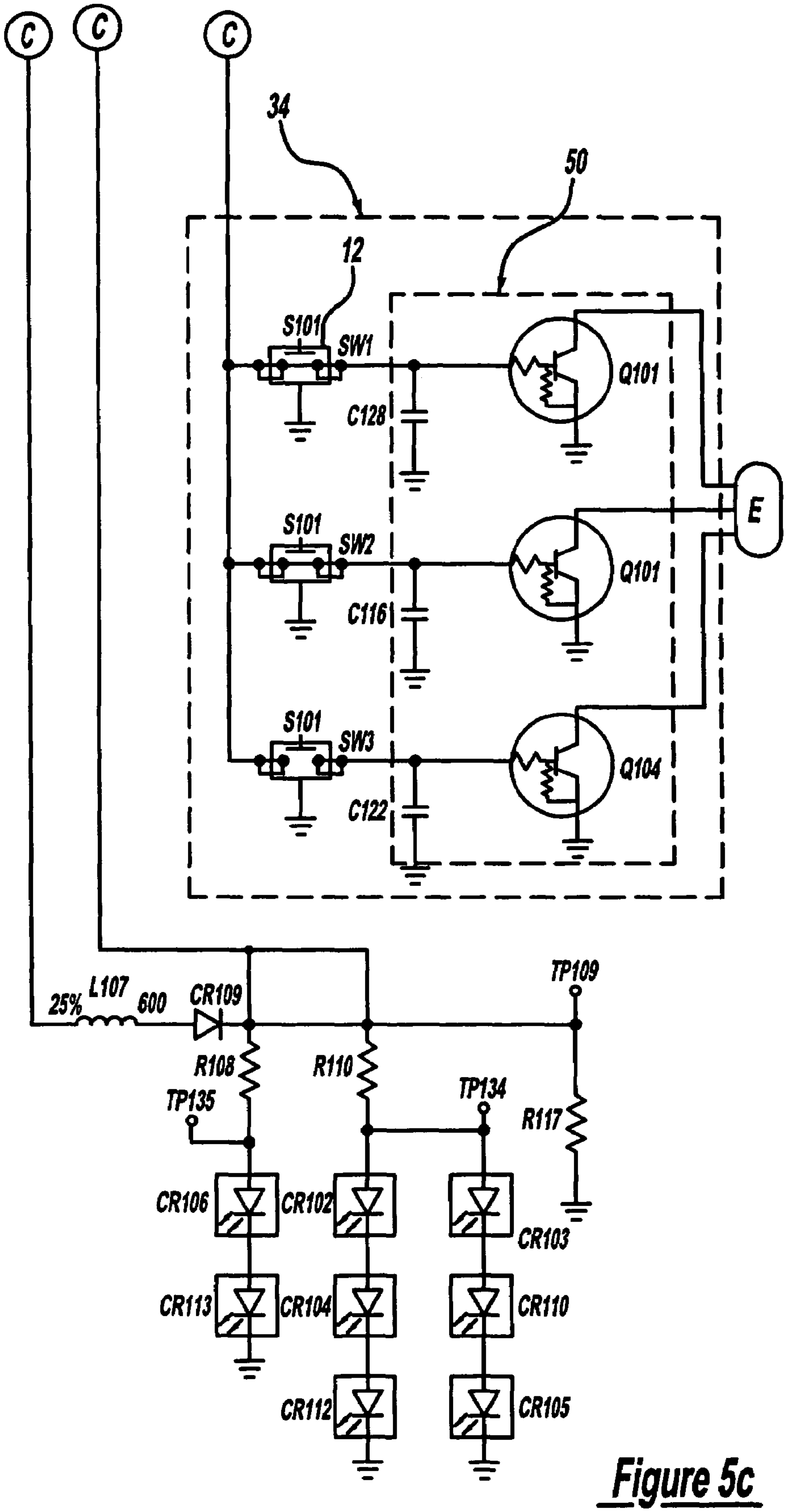
Figure 5E:
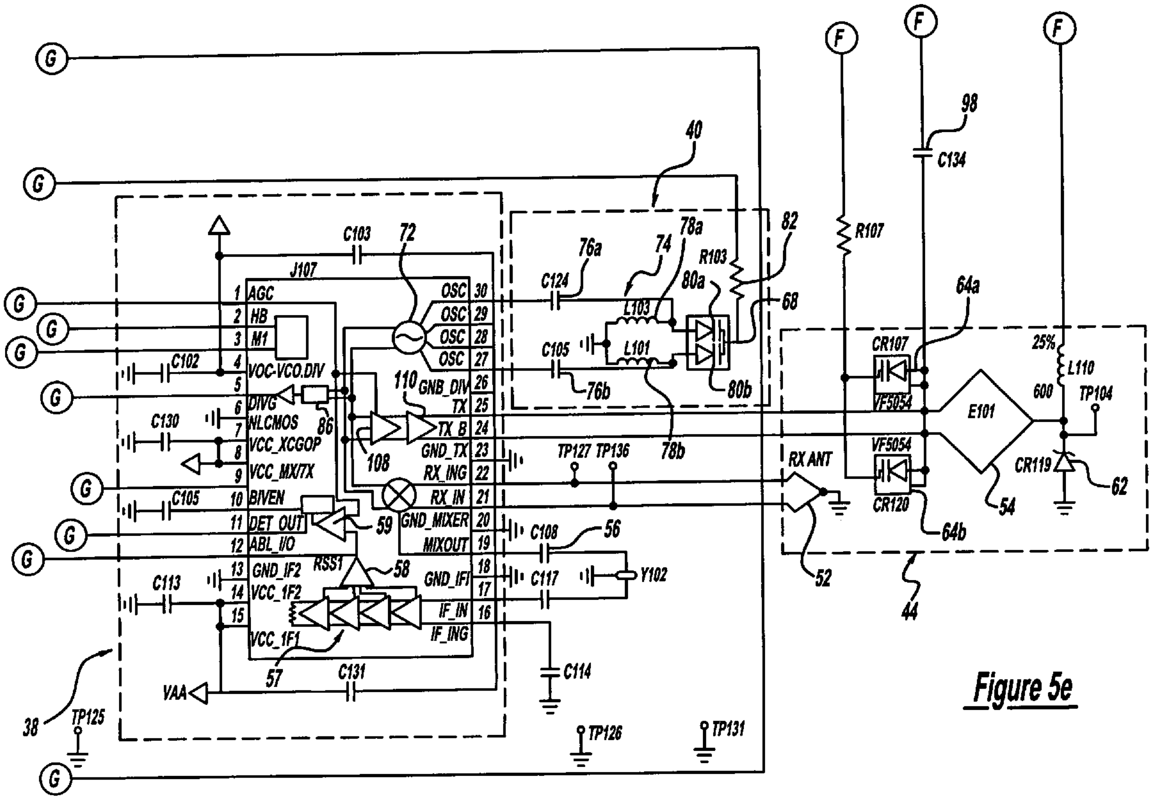

The trainable transceiver 10 may alternatively be permanently incorporated in a vehicle accessory such as a visor 28 (FIG. 3) or a rearview mirror assembly 30 (FIG. 4). Although the trainable transceiver 10 has been shown as incorporated in a visor and mirror assembly and removably located in an overhead console compartment, the trainable transceiver 10 could be permanently or removably located in the vehicle's instrument panel or any other suitable location within the vehicle's interior.

FIGS. 5*a*–5*e* show the electrical circuitry of the trainable transceiver 10 in schematic form. The electrical circuit schematic may be separated into seven primary components: power circuitry 32; user interface circuitry 34; a controller/microprocessor 36 and its associated circuitry which is used to execute the training, coarse tuning, fine tuning, and power level control software routines to be described later; a transceiver applications specific integrated circuit (ASIC) 38 and its associated circuitry; a voltage controlled oscillator (VCO) 40; antenna tuning circuitry 42; a plurality of antennas 44; and power level sense or detector circuitry 46.

The power supply circuitry 32 is conventionally coupled to the vehicle's battery (not shown) through a connector and is coupled to the various components of the present invention and is used for supplying the necessary operating power to the trainable transceiver 10.

The user interface circuitry 34 includes the switches 12, 14, and 16 that are electrically coupled to the data input terminals 48 of the microprocessor 36 through switch interface circuitry 50, including filtering capacitors and sinking transistors. The switches 12, 14, and 16 as programmed by the user may each correspond to a different device to be controlled such as different garage doors, electrically operated access gates, house lighting controls or the like, each of which may have their own unique operating RF frequency modulation scheme, and/or security code. Thus, the switches 12, 14, and 16 correspond to different radio frequency channels that are generated by the trainable transceiver 10. Once the RF channel associated with one of the switches 12, 14, and 16 has been trained to an RF activation signal transmitted from a portable, remote original transmitter (not shown) associated with a device such as a garage door opener (not shown), the transceiver 10 will then transmit an RF signal having the identified characteristics of the RF activation signal. Each RF channel may be trained to a different RF signal such that a plurality of devices in addition to a garage door opener may be activated by depressing one of the corresponding switches 12, 14, and 16. Such other devices may include additional garage door openers, a building's interior or exterior lights, a home security system, or any other device capable of receiving an RF control signal.

The microprocessor 36 is further connected to the LED 18 by an output terminal which is illuminated when one of the switches 12, 14, and 16 is closed. The microprocessor 36 is programmed to provide signals to the LED 18. The LED 18 will be controlled by the microprocessor 36 to slowly flash when the circuit enters a training mode for one of the RF channels associated with the switches 12, 14, and 16. The LED 18 will rapidly flash when a channel is successfully trained, and will slowly flash with a distinctive double blink to prompt the operator to reactuate the transceiver 10. The LED 18 may be a multi-color LED that changes color to indicate when a channel is successfully trained or to prompt the operator to reactuate the remote transmitter. Once trainable transceiver 10 is trained, the LED 18 lights continuously when one of the switches 12, 14, and 16 is depressed to indicate to the user that the transceiver 10 is transmitting a signal.

The plurality of antennas 44 includes a receiving antenna 52 and a transmission antenna 54. The receiving antenna 52 which receives a signal from a remote original transmitter (not shown) is coupled to a mixer 55 and a filter 56, which process the received signal. The processed signal is applied to a series of cascaded differential IF amplifiers 57 coupled to a summing amplifier 58 to evaluate the transmission strength of the signal from the original transmitter. The output of the summing amplifier 58 is applied to a comparator 59 whose reference voltage is provided by the AGC output 92 of the microprocessor 36 via an D/A converter 94 (the AGC output 92 doubles as the reference voltage for the comparator 59 and the control signal to the AGC amplifier 108, as discussed below). If the input of the comparator 59 is greater than the AGC output 92 of the microprocessor 36, the comparator 59 will output a logical one signal. This logical one signal indicates to the microprocessor 36 that the power level of the original transmitter is acceptable to attempt to train the transceiver 10.

The transmission antenna 54 is preferably a dynamically tunable loop antenna coupled indirectly via a choke 62 to a reference voltage level and coupled to varactor diodes 64*a* and 64*b*. The varactor diodes 64 change the impedance characteristics of the transmission antenna 54 in response to a control voltage applied to the cathode of the varactor diodes 64. The control voltage is determined by the microprocessor 36 which provides a pulse width modulated (PWM) signal from PWM output 66 to the antenna tuning circuitry 42 which converts the PWM signal to a control voltage. By using an antenna that is dynamically tuned, one may program the microprocessor 36 to selectively adjust the resonance frequency of the transmission antenna 54 to maximize its transmission characteristics for each particular frequency at which an RF signal is transmitted.

Thus, the transmission antenna 54 may be dynamically tuned to maximize the efficiency at which it radiates a transmitted electromagnetic RF signal. In addition, when the transmission antenna 54 is dynamically tuned to a resonance frequency corresponding to the carrier frequency of the transmitted signal, the transmission antenna 54 can remove unwanted harmonics from the signal.

Coupled to the transmission antenna 54 for transmitting a learned RF control signal is the transceiver ASIC 38 and the VCO 40. The VCO has a control input terminal 68 coupled to an output terminal 70 of the microprocessor 36 for controlling the frequency output of the VCO 40. The VCO 40 also includes an oscillator block 72 which outputs a sinusoidal signal and an LC resonator 74.

The LC resonator 74 includes coupling capacitors 76*a* and 76*b*, inductors 78*a* and 78*b*, and varactor diodes 80*a* and 80*b*. The coupling capacitor 76*a* has one terminal connected to the oscillator 72 and the other terminal coupled to the inductor 78*a* and the anode of the varactor diode 80*a*. The coupling capacitor 76*b* has one terminal connected to the oscillator 72 and the other terminal coupled to both the inductor 78*b* and the anode of the varactor diode 80*b*. The inductors 78 and varactor diodes 80 form a resonating LC circuit having a variable resonant frequency that is changed by varying the voltage to the cathodes of the varactor diodes 80. This voltage is varied through the control input terminal 68 and a resistor 82 from the output terminal 70 of the microprocessor 36. The microprocessor 36 controls the voltage applied to control input terminal 68.

A feedback loop may be incorporated into the control of the VCO 40 where the oscillation frequency is monitored by the microprocessor 36 which adjusts the voltage at the control input terminal 68 to generate the desired oscillation frequency (frequency synthesizer control). The feedback is provided by a prescaler 86 coupled to an input 88 on the microprocessor 36 which measures the frequency of the VCO 40 output signal.

The power level sense or detector circuitry 46 of the transceiver 10 provides frequency and amplitude tuning feedback for the transmission antenna 54. The detector 46 comprises a Schottky diode 96 and bias components, including a capacitor 98, functioning as a high pass filter or D.C. block, a resistor 100 tied to a voltage source (VCC), a resistor 102, a resistor 104, and a capacitor 106, functioning as a low pass filter. This detector circuitry 46 provides a DC voltage proportional to the RF voltage or power level on the transmission antenna 54. As the transmission antenna 54 is tuned toward resonance, the RF voltages on the antenna rise, likewise the detector circuitry 46 DC output voltage rises until resonance is reached and then begins to drop again past resonance. The microprocessor 36 is programmed with algorithms described below which tune the transmission antenna 54 via the varactor diodes 80 exactly to the peak resonance. It will be appreciated that the detector circuitry 46 may also be used to secure phase shift of the detected signal.

Two methods of tuning the transmission antenna 54 are use: (1) coarse tuning and (2) fine or "on the fly" tuning. Both types of tuning are performed each time one of the switches 12, 14, and 16 is actuated. Coarse tuning is performed prior to any modulation by sweeping the varactor diodes 64 across resonance. While sweeping the transmission antenna 54 varactor diode 64 voltages, the detector circuitry 46 output DC voltage is monitored. When the detector circuitry 46 output reaches a peak, the microprocessor 36 instantaneously measures and records the transmission antenna 54 tuning voltage. Then, through software, the transmission antenna 54 tune point is ascertained. Once coarse tuning is complete the transceiver 10 will begin to transmit. As the transceiver 10 begins modulating, the fine tuning algorithm will operate similar to the coarse tuning algorithm. The fine tuning algorithm will step the varactor diodes 64, and ascertain the correct tuning voltage. Limits are in place to allow only a small amount of adjustment in the fine tuning mode.

A further important factor to control in the transceiver 10 of the present invention is the output power level control. The VCO 40 provides the signal input to an automatic gain control (AGC) amplifier 108 coupled to an output amplifier 110 (both located in the transceiver ASIC 38) which provide the excitation for the transmission antenna 54 and thus the power level of the transmitted signal. The AGC amplifier's 108 gain is controlled by an analog voltage supplied by the microprocessor 36 from output 92 via a pulse width modulated digital to analog converter 94. Because FCC regulations allow different power levels base upon the duty cycle of a transmitted signal, it is advantageous for the trainable transceiver to be capable of dynamically adjusting the gain of the transmitted signal. The output level of the transceiver 10 is linked to the on-time of the original transmitter. The shorter the on-time of the original transmitter, the more output power allowed by the FCC. By providing the AGC amplifier 108, the transceiver 10 can transmit at the maximum allowable power for each frequency and duty factor.

There are many other problematic factors which may affect the performance of the transceiver 10 power level and may be eliminated by varying the power level of the transmission. These factors include: (1) manufacturing consistency and quality of circuit components; (2) environmental variables; and (3) other external loss variations. Not every integrated circuit (IC) is exactly the same as another, even though they may share the same model number. Performance changes over a three year manufacturing cycle for an IC can by significant. Temperature will vary the performance of an IC, as no IC is devoid of some dependency on the temperature at which it is running and temperature may affect the output current of the amplifiers in the IC. External loss variation over process and temperature will vary the load the amplifiers will be driving.

The detector circuitry 46 voltage may be incorporated as transmission power feedback to significantly reduce transmission power process errors. As described above with reference to the tuning of the transmission antenna 54, the detector circuitry 46 outputs a DC voltage that is directly proportional to the RF voltage or power level on the transmission antenna 54. The RF voltage on the transmission antenna 54 is directly proportional to the radiated field strength of the transmission antenna. Accordingly, algorithms are incorporated into the transceiver 10 to vary the output of the AGC amplifier 108 and therefore the output amplifier 110 and the radiated field strength of the transmission antenna 54 in response to the detector circuitry 46 DC voltage feedback. This feedback may be used to control both the tuning of the transmission antenna 64 resonance and the transmission power of the transmission antenna 64.

The duty cycle is measured at train time, this is used to calculate the needed transmission power level. This valve is stored in nonvolatile memory (NVM) in the microprocessor 36. Radiated field measurements were previously taken (during the product development of the transceiver 10) to characterize the exact relationship between detector 46 voltage and field strength. This information is loaded into the power level control algorithm and is used to calculate detector 46 target voltages based on the duty cycle of the desired signal.

In operation, when the transceiver 10 is activated, a target detector 46 voltage is recovered from the NVM and loaded into the power level control routine. Once the antenna is tuned, the power level control routine adjusts the AGC control voltage until the detector 46 voltage is equal to the target voltage. Ongoing monitoring of the detector 46 voltage ensures that the field strength remains constant. Thus, since the detector 46 output voltage is accurate, the output field strength is always kept very close to optimum output field strength over process, temperature and various load.

In a first example, where the duty cycle of an original transmitter will allow the increase in output of the transmission antenna 54, the AGC 108 will increase the voltage it applies to the output amplifier. The AGC 108 will be controlled by algorithms in the microprocessor 36 via the digital to analog converter 94 to increase the transmission antenna 54 output. The algorithms will calculate, according to FCC regulations, the maximum output power allowed and then monitor and control the output power on the transmission antenna 54 with feedback provided by the detector circuitry 46.

In a second example, where the transmission output power setpoint for the transmission antenna 54 has been affected by the problematic IC transmission factors detailed above, the transceiver 10 of the present invention may compensate. The detector circuitry 46 will provide feedback which is used by the microprocessor 36 and its associated algorithms to increase or decrease the output power of the transmission antenna 54 to the setpoint needed.

As seen from the two examples, the detector circuitry 46, in combination with the rest of the transceiver 10 circuitry, provides an accurate measure of the transmission power of the transmission antenna 54. By providing this feedback, the transceiver 10 may take advantage of FCC regulations to increase output power for original remote transmitters which have low duty cycles and compensate for other factors which might adversely affect the transmission power of the transceiver 10.

The software/algorithms described above will now be detailed with reference to FIGS. 6–9. The algorithms used in the present invention include: a training algorithm which incorporates antenna tuning and power level adjustment; a coarse antenna tuning routine which roughly tunes the transmission antenna 54; a fine tuning or "on the fly" tuning routine which improves upon the transmission antenna 54 tuning of the coarse tuning routine; and a transmit power level control routine which varies the power output of the transmission antenna 54.

Figure 6:
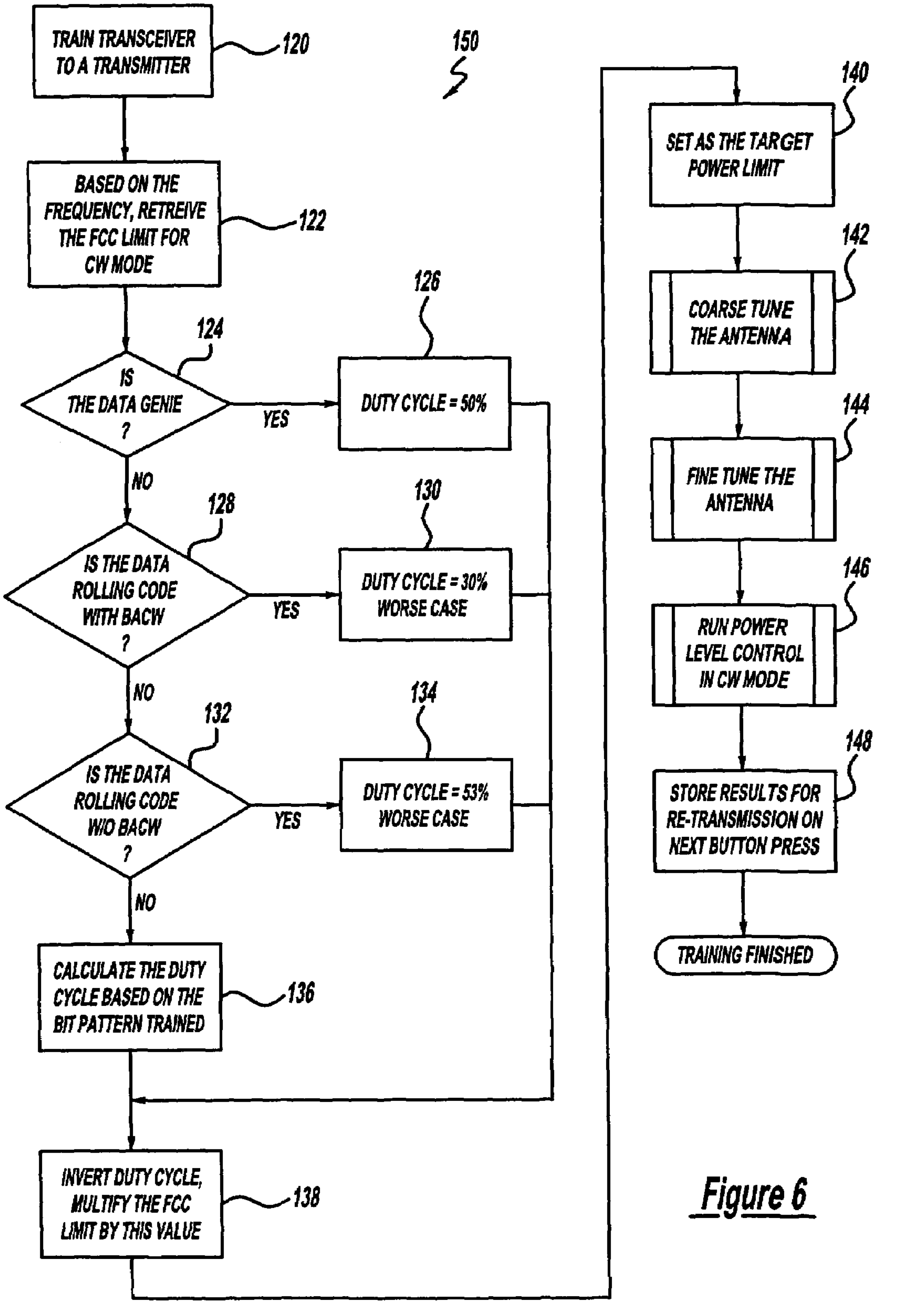
FIG. 6 is a flow diagram of the antenna tuning and power level adjustment at train time algorithm, according to the preferred embodiment of the present invention.

Referring to FIG. 6, the training routine 150 will now be described. The training routine 150 teaches the transceiver 10 of the present invention the radio frequency, modulation scheme, and data code for an original portable remote transmitter associated with an existing receiving unit. Starting at block 120, the operator initiates the training sequence at the user interface and, at the same time, the operator initiates the transmit function of the existing portable transmitter. The transceiver 10 will detect the frequency of the transmission on receiving antenna 52. Next at block 122, based on the frequency, the FCC power limit for continuous wave (CW) mode will be retrieved from the NVM. As discussed previously, the FCC limits transmission power with respect to duty cycle. Continuing to Blocks 124–134, the routine 150 will determine if the data code is for a specific existing portable transmitter and set the duty cycle. At block 124, if the transmitted information is from a Genie transmitter, the routine 150 will advance to block 126 and the duty cycle will be set at 50%. If the transmitted information is not from a Genie transmitter, the routine 150 will advance to block 128 which will determine if the transmitted data is rolling code with blank alternative code word (BACW). By definition, rolling code routines change the data being transmitted to a receiver, thus varying the duty cycle. If the transmitted data is rolling code with BACW, the routine 150 will advance to block 130 which will set the duty cycle to approximately 30%. The longest duty cycle for rolling code with BACW has been empirically determined to be approximately 30%, thus approximately 30% is the worst case. If the transmitted information is not rolling code with BACW, block 132 will determine if the transmitted data is rolling code without BACW. If the transmitted data is rolling code without BACW, the routine will advance to block 134 which will set the duty cycle to 53%. The longest duty cycle for rolling code without BACW has been empirically determined to be 53%, thus 53% is the worst case. If the transmitted information is not rolling code without BACW the routine 150, will advance to block 136. Block 136 will then calculate the duty cycle based on the bit pattern trained.

After the duty cycle is determined, the routine 150 will advance to block 138 where the duty cycle is inverted and multiplied by the previously retrieved FCC power limit for the frequency of transmission. For example, a 50% duty cycle will enable the transceiver to transmit at twice the power level for a continuous wave transmission having the same frequency. After this power level has been determined, the program advances to block 140, where the power level is stored in NVM.

The routine 150 will then advance to a coarse antenna tuning block/routine 142 and a fine antenna tuning block/routine 144 which will be described in detail below. Upon completing the coarse 142 and fine antenna 144 tuning routines, the control parameters for the antenna tuning and power transmission calculations will be stored in NVM at block 148 for retransmission.

Figure 7:
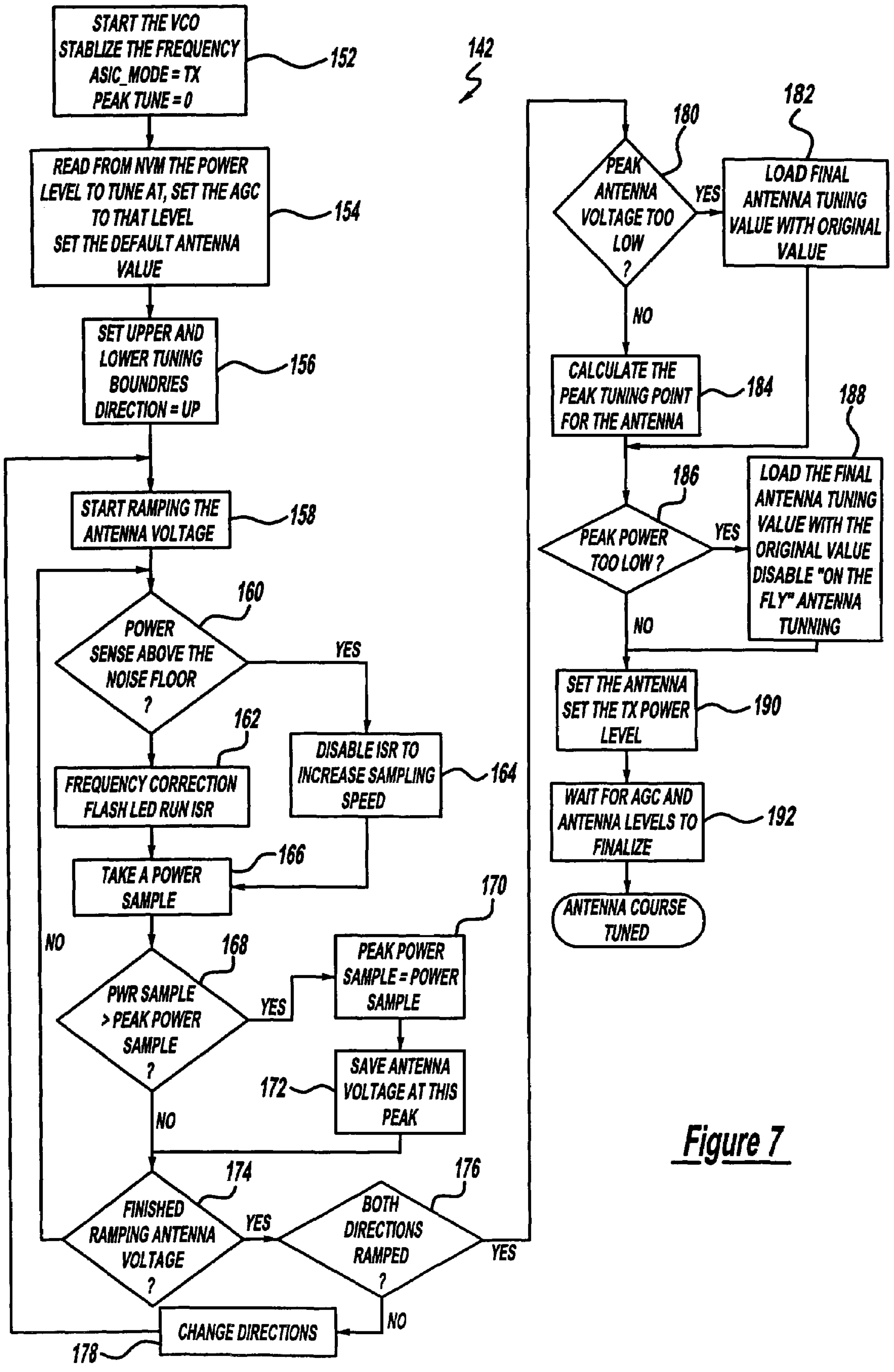
FIG. 7 is a flow diagram for the coarse tuning algorithm, according to the preferred embodiment of the present invention.
Figure 8:
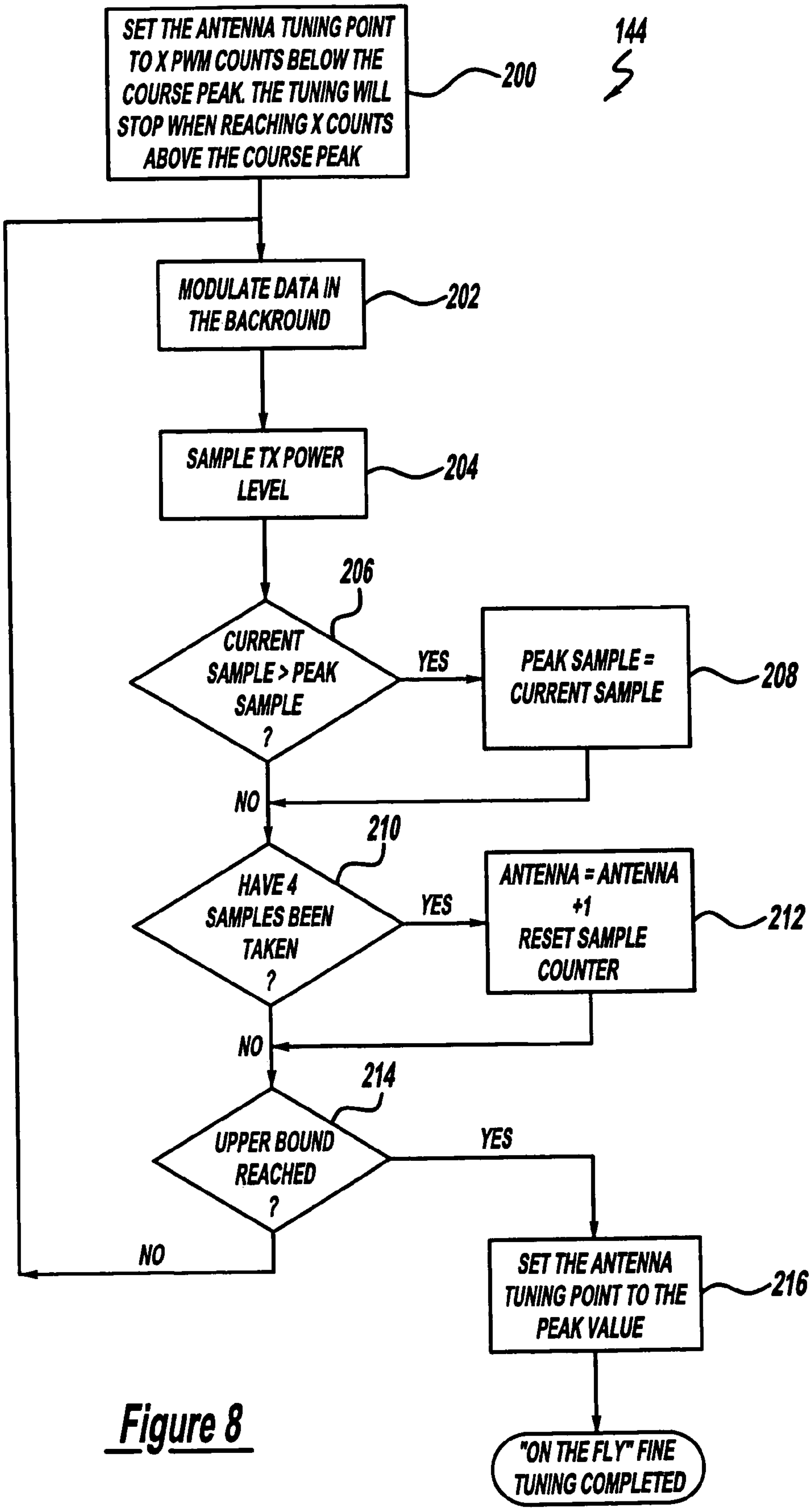
FIG. 8 is a flow diagram for the fine antenna tuning algorithm, according to the preferred embodiment of the present invention.
Figure 9:
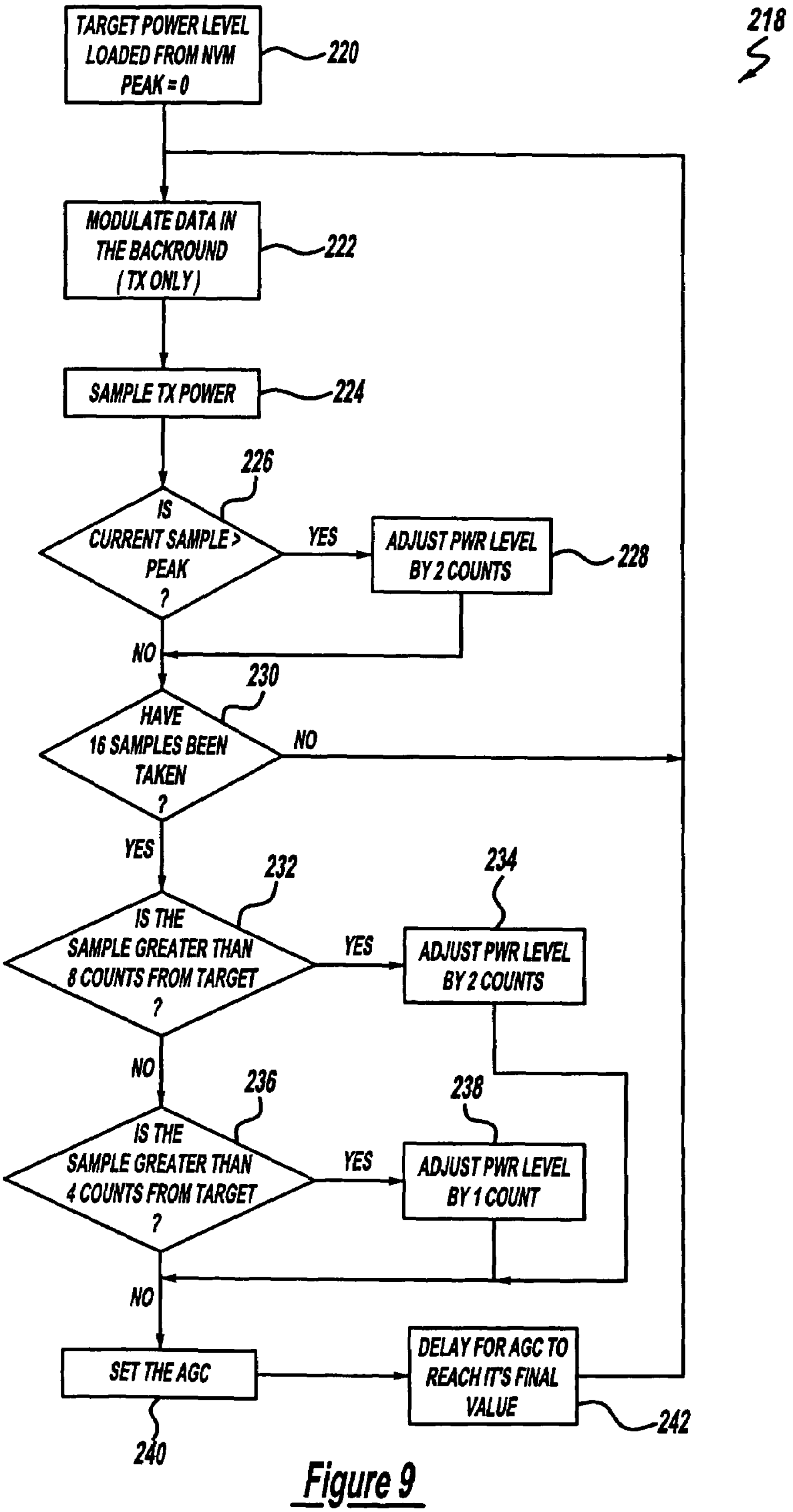
FIG. 9 is a flow diagram for the transmit power level control algorithm, according to the preferred embodiment of the present invention.

Referring to FIG. 7, the coarse antenna tuning routine 142 will now be described. The coarse antenna tuning routine will roughly tune the antenna 54 before any transmission of data takes place. The coarse antenna tuning is performed each time one of the switches 12, 14, and 16 of the user interface circuitry 36 is actuated to successfully train the transceiver 10 or transmit data to a remote receiver. Starting at block 152, the VCO 40 is set to generate the frequency which was learned from an existing portable transmitter. The VCO 40 will stabilize the generated frequency using the frequency synthesizer control previously described. The transceiver 10 will further be put into transmit mode and the peak tune level will be initialized to zero. The routine 142 will then advance to block 154 where a starting transmission power level is read from NVM and is used to set the AGC 108. The transmission power level is held constant through the coarse tuning routine so that the detector circuit 46 output is only affected by the transmission antenna 54 tuning. Block 154 also sets the frequency tuning of the transmission antenna 54 to a default value such as 310 MHz in case of a hardware fault. This default level will ensure that the transmission antenna 54 is at least roughly tuned in the event of such a hardware fault. The routine 142 will then advance to block 156 where the upper and lower tuning limits for the PWM output 66/antenna tuning circuitry 42 are set. To reiterate, the PWM output 66 is the control output of the microprocessor 36 for tuning the transmission antenna 54. The antenna tuning circuitry 42 converts the PWM output to a DC voltage which is applied to the varactors 64. Continuing to block 158, the voltage output from the antenna tuning circuitry 42 is ramped up via the change in the output of the PWM output 66 which is controlled by the microprocessor 36.

In block 160 the output of the detector circuit 46 is compared to the noise level. If the output of the detector circuit 46 is greater than the noise floor, then the interrupts are disabled and sampling speed is increased in block 164. If the opposite is true the routine 142 will advance to block 162 where the frequency will be checked and then corrected, an led will flash if needed, and the interrupts will run. Both block 162 and 164 will advance to block 166 where a sample of the detector circuit 46 output will be taken. As previously mentioned, the detector circuit 46 voltage output is directly related to the RF voltage or power level transmitted by the transmission antenna 54.

Block 168 determines if the sampled detector circuit 46 output is greater than the peak power sample. The peak power sample is the detector circuit 46 output sample of greatest magnitude which has been measured during this coarse tuning routine 142. If the sampled detector circuit 46 output is greater than the peak power sample, this latest sampled detector circuit 46 output now becomes the peak power sample and is saved, as seen in blocks 170 and 172. If the sampled detector circuit 46 output is not greater than the peak power sample, the routine will return to block 158 and continue to ramp the antenna tuning circuitry 42 output voltage. The routine 142 will also continue to test if the latest detector circuit 46 output is greater than the peak power sample until the antenna voltage is finished ramping, as seen in block 174. Block 174 verifies that the ramping of the antenna circuitry 42 output voltage is finished and the routine 142 then advances to block 176 which determines if the ramping of the antenna circuitry 42 output voltage has been ramped up and down. If the antenna circuitry 42 voltage has not been ramped in both directions, then the ramp direction will be changed at block 178 and the routine 142 will return to block 158 to execute the ramping blocks again.

Continuing to block 180, the PWM output 66/antenna circuitry 42 output voltage will be examined to see if its value is too low. As described above, the PWM output 66 signal is converted to a DC voltage value by the antenna circuitry 42 to bias the varactor diodes 64. A low antenna circuitry 42 output voltage may occur as a result of circuit failure. If the value is to low, a default PWM output 66/antenna circuitry 42 output voltage will be loaded at block 182. If the value is not to low, the routine 142 will advance to block 184 where the peak tuning point for the antenna 54 will be calculated.

In the next block 186, the detector circuit 46 output voltage is examined to see if its value is too low. Block 186 double checks the detector circuit 46 feedback and determines if there is a detector circuit 46 failure or total tuning failure. If the value is too low, a default PWM output 66/antenna circuitry 42 output voltage will be loaded at block 188.

Continuing to block 190 the PWM output 66/antenna circuitry output 42 is set and output to the varactor diodes 64 and the transmission power level or gain on the AGC 108 is set. The routine 142 then waits for the AGC 108 to ramp up and the transmission antenna 54 tuning voltages to finalize. Then transmission antenna 54 is then coarse tuned.

While the coarse tuning routine 142 is executed prior to any transmission, the fine tuning routine 144 is executed while the transceiver 10 is transmitting. The fine tuning routine 144 improves upon the tuning of the coarse tuning routine 142 to better tune the transmission antenna 54 for a particular transmission frequency. The fine tuning routine 144 uses smaller increments for the PWM output 66 and therefore has better resolution which leads to improved tuning for the transmission antenna 46. Beginning at block 200, the fine tuning routine 144 sets the antenna tuning point or PWM output 66 to a certain number of counts below the previously calculated coarse tuning counts which correspond to the peak power sample (generated by the detector circuit 46 output). A count is defined as the duty cycle factor for the PWM output 66. The tuning will stop when the routine reaches a certain number of counts above the coarse peak. At block 202, data will be transmitted in the background on the transmission antenna 54. The detector circuit 46 output voltage will then be sampled at block 204. The following blocks 206 and 208 are similar to blocks 168 and 170 in the coarse tuning routine 142. In block 206, the sampled detector circuit 46 output voltage will be compared to a peak sample. If the sampled detector circuit 46 output is greater than the peak power sample, this latest sampled detector circuit 46 output is saved as the latest peak power sample. Continuing to blocks 210 and 212, four samples will be taken. Next at block 214 the routine 144 will check if it has reached the upper bound of counts over the coarse value. If the routine 144 has not reached the upper bound, then the routine 144 will return to block 202 and repeat the sampling blocks. If the upper bound has been reached, then the routine 144 will continue to block 216 and set the antenna tuning point or PWM output 66 to the peak value, finishing the fine tuning routine 144.

Figure 10:
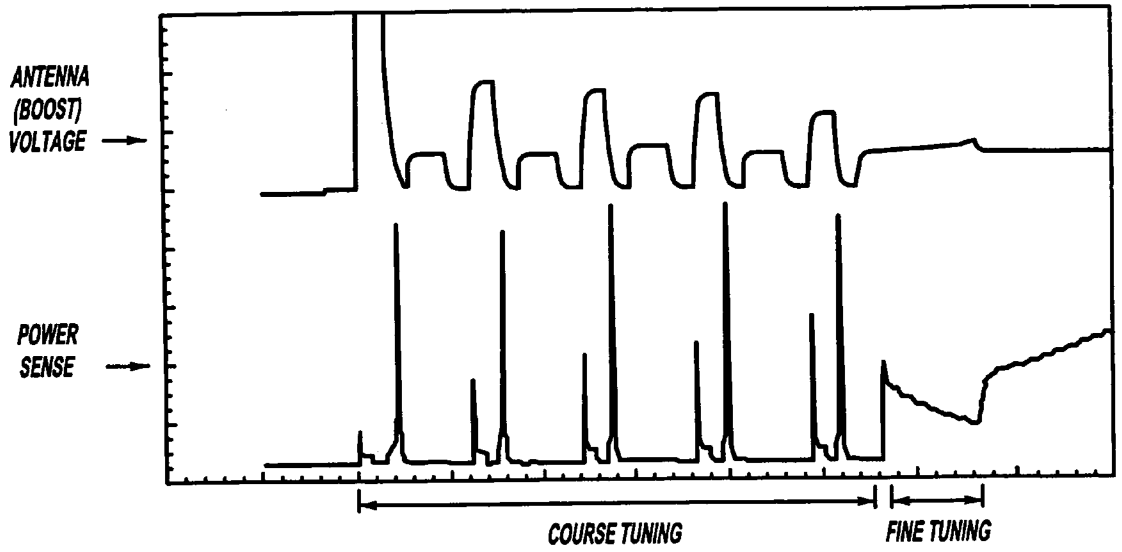
FIGS. 10–11 are graphs illustrating the power feedback with reference to the antenna boost voltage of the electrical circuitry, according to the preferred embodiment of the present invention.
Figure 11:
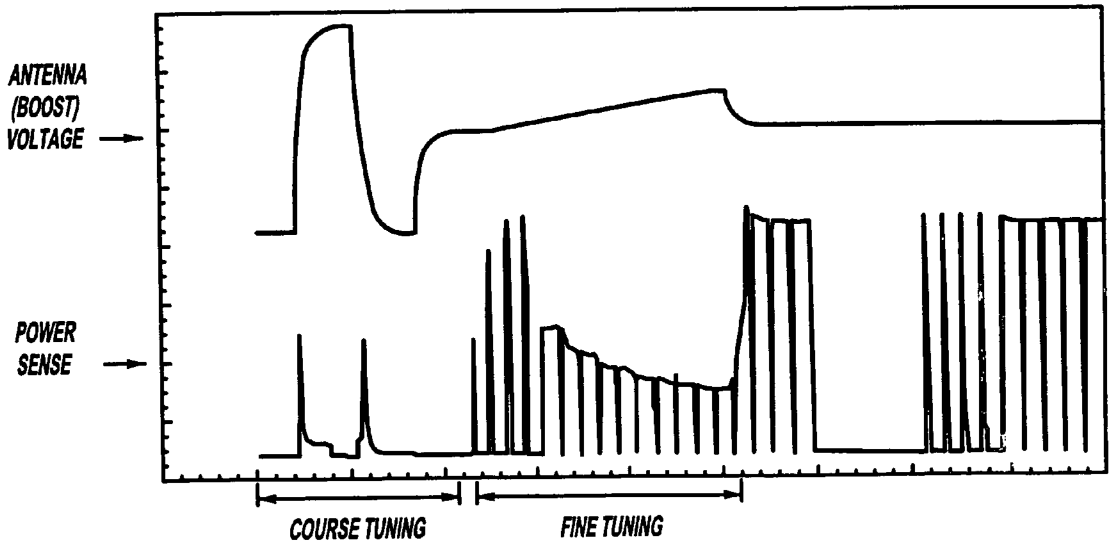

FIGS. 10–11 illustrate the PWM output 66/antenna circuitry 42 output voltage and detector circuit 46 output voltage vs. time. As can be seen from the figures the antenna boost voltage or antenna circuitry 42 output voltage varies the power output of the transmission antenna 54. The detector circuit 46 output voltage is directly related to the power output of the transmission antenna 54. Referring to FIG. 11, the sweeping action of the antenna boost voltage varies the detector circuitry 46 output. The peak resonance points of the transmission antenna 54 may be determined by the peaks in the detector circuitry 46 output.

The coarse tuning 142 and fine tuning 144 routines are executed once at the beginning of each action by the vehicle operator. The following transmit power level control routine 218 is continuously executed upon the completion of the coarse 142 and fine 144 tuning routines. The transmit power level control routine 218 controls the output power of the transmission antenna 54 with reference to the duty cycle calculation and environmental variables. Beginning at block 220, the output for the PWM output 66 and its corresponding target peak power level for the specific remote transmitter model format being used is loaded from NVM and the peak power is set to zero. This stored target peak power level gives the power level control routine 218 a starting point in the feedback loop to improve the response of the feedback loop. Continuing to block 222, data is transmitted on transmission antenna 54. Next at block 224, the detector circuit 46 output is sampled. At block 226 the current sampled detector circuit 46 output is compared to a stored peak power value. If the current sampled detector circuit 46 output is greater than the peak power value, then the current sampled detector circuit 46 output is stored as the new peak power value and the PWM output 92 counts is also stored. As previously discussed, the PWM output 92 is the microprocessor control output for changing the power of the transmission for transmission antenna 54. The PWM output 92 is coupled to the D/A converter 94 which controls the gain on the AGC 108.

If the current sampled detector circuit 46 output is less than the peak power value then the routine 218 continues to block 230 to determine if sixteen samples have been taken. If sixteen samples have not been taken, the routine 218 will return to block 222 and continue to take samples. If sixteen samples have been taken, the routine will continue to blocks 232–238 where the PWM output 92 counts will be adjusted with reference to the detector circuit 46 output sample. At block 232, the routine 218 will determine if the PWM output 92 is greater than eight counts from the previously loaded corresponding target power level. If the sample is greater than eight counts from the target power level, than the PWM output 92 will be adjusted by two counts. If the sample is not greater than eight counts from the target power level, then block 236 will determine if the PWM output 92 is greater than four counts from the target power level. If the sample is greater than four counts from the target power level, then the PWM output 92, will be adjusted by one count. If the sample is not greater than four counts from the target power level, then the PWM output 92 which controls the AGC 108 will be set. The AGC 108, as previously discussed, controls the RF voltage or transmission power of the transmission antenna 54. Finally, at block 242, a delay is incorporated to allow the AGC 108 to ramp up and reach its final value. The transmit power level routine will then execute continuously while an operator is actuating the user interface 34 of the transceiver.

It is to be understood that the invention is not limited to the exact construction illustrated and described above, but that various changes may be made if not thereby departing from the scope of the invention as defined in the following claims.

What is claimed is:

1. A transmitter for transmitting a device activation signal or other data, for remotely actuating a device, the device activation signal having an RF carrier frequency and a power level, said transmitter comprising:

a controller operable in an operating mode for providing a tune level signal that identifies the RF carrier frequency of the device activation signal;

a signal generator circuit coupled to the controller for generating the device activation signal, such that the RF carrier frequency corresponding to the controller tune level signal is generated;

a transmission antenna assembly coupled to the signal generator circuit and the controller, the transmitter antenna assembly operable for transmitting the device activation signal; and a detector circuit for detecting the power level of the device activation signal, the detector circuit providing the detected power level to the controller;

wherein the controller is further operable for tuning the transmission antenna assembly based on the detected power level including tuning the transmission antenna assembly before applying a modulation scheme such that the power level of the device activation signal is controlled and tuning the transmission antenna assembly over a limited tuning range while applying the modulation scheme.

2. The transmitter of claim 1, wherein the transmission antenna assembly has an impedance and is tunable in response to a tuning signal such that the impedance of the transmission antenna assembly is controllable thereby controlling the power level of the transmitted device activation signal.

3. The transmitter of claim 2, wherein the controller generates the tuning signal in response to the detected power level.

4. The transmitter of claim 3, wherein the controller further includes an antenna tuning module operable for tuning the impedance of the transmission antenna assembly in response to the detected power level of the device activation signal.

5. A transmitter for transmitting a device activation signal or other data, for remotely actuating a device, the device activation signal having an RF carrier frequency and a power level, said transmitter comprising:

a controller operable in an operating mode for providing a tune level signal that identifies the RF carrier frequency of the device activation signal, the controller including an antenna tuning module;

a signal generator circuit coupled to the controller for generating the device activation signal, such that the RF carrier frequency corresponding to the controller tune level signal is generated;

a detector circuit for detecting the power level of the device activation signal, the detector circuit providing the detected power level to the controller; and a transmission antenna assembly coupled to the signal generator circuit for transmitting the device activation signal, transmission antenna assembly having an impedance and being tunable in response to a tuning signal such that the impedance of the transmission antenna assembly is controllable thereby controlling the power level of the transmitted device activation signal;

wherein the controller generates the tuning signal in response to the detected power level;

wherein the antenna tuning module of the controller is operable for tuning the impedance of the transmission antenna assembly in response to the detected power level of the device activation signal and includes a coarse tuning module operable to tune the transmission antenna assembly before applying the modulation scheme such that power level of the device activation signal is controlled; and a fine tuning module operable to tune the transmission antenna assembly over a limited tuning range while applying the modulation scheme.

6. The transmitter of claim 5, further including a prescaler coupled from the signal generator circuit to the controller for providing a sample of the RF carrier frequency to the controller, wherein the controller adjusts the RF carrier frequency to a desired frequency.

7. The transmitter of claim 1, further comprising a gain circuit coupled to the signal generator circuit, for controlling the power level of the device activation signal, the gain circuit being responsive to a gain signal.

8. The transmitter of claim 7, wherein the controller generates the gain signal in response to the detected power level.

9. The transmitter of claim 1, further including a receiving antenna for receiving an activation signal of a remote transmitter, and wherein the controller further includes a training routine module operable to store data corresponding to the original remote transmitter activation signal for generating the output signal such that the device activation signal generated by the signal generator circuit corresponds to the activation signal of the remote transmitter.

10. The transmitter of claim 9, further comprising a gain circuit coupled to the signal generator circuit for controlling the power level of the device activation signal, the gain circuit being responsive to a gain signal provided by the controller;

the training routine module being further operable to store a starting point transmission power value from which a target detector voltage is determined; and the controller further operable to generate the gain signal in response to the target detector voltage and the detected power level.

11. A transmitter system for transmitting a device activation signal that includes an RF carrier frequency, modulation scheme, and data code for remotely actuating a device, comprising:

a controller operable in an operating mode for providing an output signal that identifies the frequency and code of the device activation signal;

a signal generator circuit coupled to the controller for generating the device activation signal such that the RF carrier frequency and data code corresponding to the controller output signal are generated;

a transmission antenna assembly, being coupled to the signal generator circuit for transmitting the device activation signal, the transmitted activation signal having a power output; and a detector circuit for detecting a power level representative of the transmitted activation signal power output, the detector circuit coupled to the controller for providing the detected power level;

wherein the controller is further operable for tuning the transmission antenna assembly based on the detected power level including tuning the transmission antenna assembly before applying a modulation scheme such that the power level of the device activation signal is controlled and tuning the transmission antenna assembly over a limited tuning range while applying the modulation scheme.

12. The transmitter system of claim 11, wherein the transmission antenna assembly is tunable in response to a tuning signal such that the impedance of the transmission antenna assembly is varied, whereby the power output of the transmitted activation signal is controllable.

13. The transmitter system of claim 12 wherein the controller further includes an antenna tuning module activable for tuning the impedance of the transmission antenna assembly in response to the detected power level.

14. The transmitter system of claim 12, further comprising a gain circuit coupled to the signal generator circuit, for controlling the power output of the device activation signal, said gain circuit begin responsive to a gain signal.

15. The transmitter system of claim 12, further comprising a gain circuit coupled to the signal generator circuit for controlling the power output of the device activation signal, the gain circuit begin responsive to a gain signal provided by the controller; and the controller being further operable to store a starting point transmission power value from which a target detector voltage is determined, the controller operable to generate the gain signal in response to the target detector voltage and the detected power level.

16. The transmitter system of claim 15, further including a receiving antenna for receiving an original activation signal of an original remote transmitter associated with an original receiving unit, and wherein the controller further includes a training routine module operable to store data corresponding to the original remote transmitter activation signal for generating the output signal, such that the controller output signal corresponds to the original activation signal.

17. The transmitter system of claim 16, further comprising a user interface and wherein the signal generator circuit includes a voltage controlled oscillator.

18. A method of transmitting a device activation signal for remotely actuating a device, the device activation signal having an RF carrier frequency and a power level, comprising the steps of:

providing a transmission antenna assembly having a tunable impedance;

generating the RF carrier frequency;

generating an antenna assembly tuning signal for controlling the antenna assembly impedance;

transmitting the device activation signal;

detecting the activation signal power level; and adjusting the antenna assembly tuning signal in response to the detected activation signal power levels;

wherein the antenna assembly tuning signal is adjusted before applying a modulation scheme such that the activation signal power level is controlled and the antenna assembly tuning signal is adjusted while applying the modulation scheme.

19. A method of transmitting a device activation signal for remotely actuating a device, the device activation signal having an RF carrier frequency and a power level, comprising the steps of:

providing a transmission antenna assembly having a tunable impedance;

generating the RF carrier frequency;

generating an antenna assembly tuning signal for controlling the antenna assembly impedance;

transmitting the device activation signal;

detecting the activation signal power level;

adjusting the antenna assembly tuning signal in response to the detected activation signal power level;

storing a starting point transmission power value;

determining a target detector voltage based on the starting point transmission power value;

comparing the detected activation signal power level to the target detector voltage;

generating a power level control signal for controlling the power level of the device activation signal; and adjusting the power level control signal such that the detected activation signal power level approximately corresponds to the target detector voltage.

20. The method of claim 18 wherein the step of generating the RF carrier frequency further comprises the steps of:

generating a tune level signal for controlling the RF carrier frequency;

generating the RF carrier frequency in response to the tune level signal;

sensing the RF carrier frequency; and adjusting the tune level signal in response to the sense RF carrier frequency.

21. A transmitter for transmitting a device activation signal or other data, for remotely actuating a device, the device activation signal having an RF carrier frequency and a phase shift, said transmitter comprising:

a controller operable in an operating mode for providing a tune level signal that identifies the RF carrier frequency of the device activation signal;

a signal generator circuit coupled to the controller for generating the device activation signal, such that the RF carrier frequency corresponding to the controller tune level signal is generated;

a transmission antenna assembly coupled to the signal generator circuit and the controller, the transmitter antenna assembly operable for transmitting the device activation signal; and a detector circuit for detecting the phase shift of the device activation signal, the detector circuit providing the detected phase shift to the controller;

wherein the controller is further operable for tuning the transmission antenna assembly based on the detected phase shift including tuning the transmission antenna assembly before applying a modulation scheme such that the phase shift of the device activation signal is controlled and tuning the transmission antenna assembly over a limited tuning range while applying the modulation scheme.

* * * * *